Feb. 28, 1967      C. F. ALBAN      3,307,001

MAGNETIZED THERMOSTATIC ELEMENT

Filed Jan. 29, 1965

INVENTOR
CLARENCE F. ALBAN

BY Olsen and Stephenson
ATTORNEYS

United States Patent Office 3,307,001
Patented Feb. 28, 1967

3,307,001
MAGNETIZED THERMOSTATIC ELEMENT
Clarence F. Alban, Detroit, Mich., assignor to W. M. Chace Company, Detroit, Mich., a corporation of Delaware
Filed Jan. 29, 1965, Ser. No. 428,990
10 Claims. (Cl. 200—113)

This invention relates generally to thermostatic switches, and more particularly to an improved thermostatic switch element which includes a magnetized lamina that can impart snap action to a switch.

Thermostatic bi-metal elements are widely used as control switches. One common environment for such an element, for example, is in a heater circuit control switch. In such an environment, as the ambient temperature decreases, the thermostatic element deflects in a direction to slowly move a contact thereon toward a fixed contact until the contacts engage. When the contacts are engaged the heater operates and as a result the ambient temperature is increased, causing the thermosatic element to deflect in a direction tending to move the contact thereon away from the fixed contact. Both during movement of the movable contact toward and away from the fixed contact, some objectionable arcing and burning of the contacts is likely to occur by virtue of the relatively slow movement of the thermostatic element. It is an object of this invention, therefore, to provide an improved laminated thermostatic element in which one of the lamina is a magnetized material thereby providing for snap action of a switch incorporating the improved element of this invention without complicating or adding significantly to the cost of the switch; and to provide improved switch structures utilizing a thermostatic element having a magnetized lamina.

Further objects, features and advantages of this invention will become apparent from a consideration of the following description, the appended claims, and the accompanying drawing in which:

Figure 1:
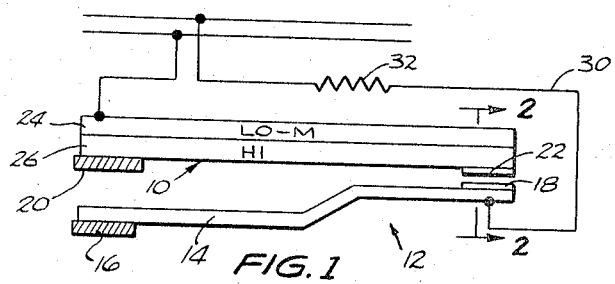
FIGURE 1 is a side view of the thermostatic element of this invention, showing the element incorporated in one form of a control switch for a heater circuit.

With reference to the drawing, one form of a snap action or quick "make and break" switch utilizing the thermostatic element of this invention, indicated generally at 10, is illustrated in FIG. 1 at 12. The switch 12 includes a first switch member 14 secured at one end to a suitable support 16 and provided at the opposite end with a contact 18. The member 14, or at least the end portion thereof which carries contact 18, is formed of a material which is attracted to a permanent magnet, such as iron. The thermostatic element 10 constitutes a second switch member and is mounted at one end on a suitable support 20 and has a contact 22 affixed to its opposite end at a postion such that the contacts 18 and 22 are in a closely spaced facing relation. In a preferred embodiment of the invention, the contacts 18 and 22 are formed by plating a thin layer of gold on the switch members 10 and 14 since the electrical conductivity of gold is excellent thereby enabling the arrangements of the contacts 18 and 22 so that the gap therebetween is small.

Figure 2:
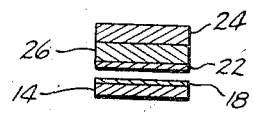
FIGURE 2 is an enlarged transverse sectional view of the switch shown in FIG. 1, looking substantially along the line 2—2 in FIG. 1.

The element 10 is formed of a plurality of laminations, illustrated as two in number and indicated at 24 and 26 in FIGS. 1 and 2, which are arranged in surface-to-surface contact and secured over substantially the entire area of their contiguous surfaces so that the element 10 acts as an integral whole. The lamination 24 is labeled "LO-M" in the drawing because it has a coefficient of thermal expansion lower than the coefficient of thermal expansion of the lamination 26 and because it is formed of a material which is a permanent magnet. In a preferred embodiment of the invention, the lamination 24 is an alloy of cobalt, iron and vanadium in which the proportions of these metals are within the following ranges: cobalt 47.5% to 48.5%; iron 47.5% to 48.5%; vanadium 3% to 5%. The coefficient of thermal expansion of this alloy is $9.43 \times 10^{-6}$ per ° C. in a temperature range of from 30° C. to 102° C.

This alloy is selected because it has sufficient malleability and ductility to permit it to be rolled into a thin lamination 24. It also has a high elastic modulus and can be readily electroplated. This alloy is selected because it is also capable of exceedingly high values of remanence. The lamination 26 is labeled "HI" because it has a coefficient of thermal expansion higher than the coefficient of thermal expansion of the lamination 24. In a preferred embodiment of the invention, the lamination 26 is an alloy of 22% nickel, 3% chromium, and 75% iron. This material is non-magnetic and has an expansion coefficient of $19.5 \times 10^{-6}$ per ° C. at 100° C. The lamination 26 can also be an alloy of 72% manganese, 18% copper, 10% nickel, which alloy has an expansion coefficient of $27.4 \times 10^{-6}$ per ° C. at 100° C. In any event the material chosen for the lamination 26 should be such that it has a coefficient of thermal expansion at least as high as $15 \times 10^{-6}$ per ° C. in order to provide for sufficient difference in expandibility of laminations 24 and 26 to in turn provide for enough deflection of element 10 to obtain a desired temperature sensivity.

In a preferred embodiment of the invention, the laminations 24 and 26 are rolled together down to thin strips which are then cut to the desired length for the element 10. When the element 10 is heated, it will deflect in a direction to move the movable contact 22 away from the fixed contact 18 by virtue of the differences in the coefficients of thermal expansion of the laminations 24 and 26. Conversely, when the element 10 is cooled, it will deflect in a direction to move the contact 22 toward the contact 18. The switch 12 is illustrated in a circuit 30 for a heater 32 arranged so that when the contacts 18 and 22 are closed, heater 32 will operate thereby increasing the ambient temperature. When the contacts 18 and 22 are spaced, the circuit 30 is open so that the heater 32 will not operate, thereby allowing the ambient temperature to decrease.

By virtue of the fact that the lamina 24 is a permanent magnet, as the element 10 is deflecting in a direction to move the contact 22 toward the contact 18, as soon as the contact 22 gets close to the contact 18, but before the contacts 18 and 22 get close enough to cause arcing and burning, the magnetic lines of flux between the laminations 24 and the iron switch member 14 will provide for a snapping of the contact 22 into engagement with contact 18. When the ambient temperature decreases, the element 10 tends to deflect in a direction to move the contact 22 away from the contact 18. At such time, the force which the element 10 exerts on the contact 22 tending to move it away from the contact 18 will be resisted by the magnetic force of attraction between the lamina 24 and the switch member 14. As a result, the contacts 22 and 18 will remain in engagement until the deflection force exerted by the element 10 on the contact 22 is sufficient to snap the contact 22 out of engagement with the contact 18. At such time the element 10 has also deflected sufficiently to move contact 22 far enough away from contact 18 to avoid arcing and burning of the contacts. It can thus be seen that by virtue of the fabrication of the element 10 with a permanent magnet lamina 24, a snap action or quick make and break of the contacts 22 and 18 is insured. This action prevents the objectionable arcing and burning of the contacts 22 and 18 heretofore encountered in thermostatic switches which do not include a permanent magnet lamina. In the switch 10, the non-magnetic lamina 26 acts as a spacer between the permanent magnet lamina 24 and the magnetic material such as iron, from which the switch member 14 is constructed. The spacer lamina 26 thus functions to prevent the magnetic switch member 14 from becoming attracted to the magnet lamina 24 so as to engage the contacts 18 and 22 except under predetermined low ambient temperature conditions.

Figure 3:
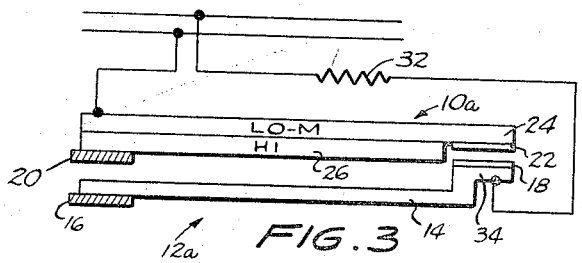
FIGURE 3 is a view similar to FIG. 1 illustrating another form of switch utilizing the thermostatic element of this invention.
Figure 4:
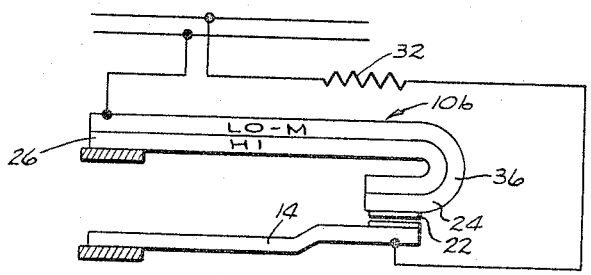
FIGURE 4 is a view similar to FIG. 1 illustrating another form of switch utilizing the thermostatic element of this invention.

In a situation requiring a more intense magnetic field between the switch member 14 and the permanent magnet lamina 24 than is present in the switch 12, in which the spacer lamina 26 is utilized, another form of switch such as those illustrated at 12a and 12b in FIGS. 3 and 4, respectively, is provided. In the switches 12a and 12b parts corresponding to parts in the switch 12 are indicated by like numerals. In the switch 12a, a thermostatic element 10a, like the element 10 previously described, constitutes the second switch member. However, in the element 10a the permanent magnet lamina 24 is of an increased length relative to the non-magnetic lamina 26 and the contact 22 is affixed directly to the permanent magnet lamina 24. The first switch member 14 has an offset end portion 34, formed of a magnetic material such as iron, which extends toward the lamina 24 so that the contacts 18 and 22 are in a closely spaced relation. In the switch 12a, therefore, the distance between the magnet 24 and the magnetic end portion 34 is reduced relative to that in the switch 12 and there is no spacer positioned between these parts. Consequently, a more intense magnetic field is provided between the magnet 24 and the end portion 34, and as a result the magnetic forces tending to move the movable contact 22 against the fixed contact 18 are increased in the switch 12a.

In the switch 12b, the thermostatic element 10b corresponding to the element 10 previously described is provided with a reversely bent upon itself, or substantially U-shape, end portion 36 so that the permanent magnet lamina 24 is adjacent to the magnetic switch member 14. The contact 22 in the switch 12b is thus affixed directly to the permanent magnet lamina 24 and arranged in a facing relation with the fixed contact 18. Consequently, magnetic forces of increased magnitude tending to move the contact 22 into engagement with the contact 18 are obtained in the switch 12b. The element 10b has the advantage that it can be readily fabricated, since only bending of the laminated strips is required.

Figure 5:
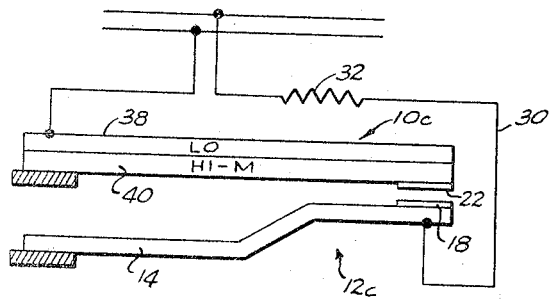
FIGURE 5 is a view similar to FIG. 1 illustrating still another form of switch utilizing the thermostaic element of this invention.

The advantages of the thermostatic element of this invention are also obtainable by forming the lamina having the higher coefficient of thermal expansion of a magnetized material. This arrangement is illustrated in FIG. 5 in a switch 12c. In the switch 12c, the thermostatic element 10c has a lamina 38 which is non-magnetic and has a lower coefficient of thermal expansion than a lamina 40 which is also magnetized. The movable contact 22 is affixed directly to the permanent magnet lamina 40 so that it is in a facing relation and closely spaced with respect to the fixed contact 18. Since the lamina 40 is a magnet, and is positioned adjacent the iron switch member 14, an intense magnetic field is obtainable with the switch 12c. In a preferred embodiment of the element 10c, the lamina 40 is the cobalt, iron and vanadium alloy disclosed above and the low expansion lamina 38 is formed of an Invar or Invar-like material consisting essentially of 36% nickel and 64% iron, which material has a coefficient of thermal expansion which is nearly zero.

It is to be understood that the shape and arrangement of the lamina in a thermostatic element 10, 10a, 10b, or 10c is dependent in each case on the intended function and environment of the switch in which the element is positioned. For example, in an air conditioner circuit wherein it is desired to close the contacts 22 and 18 in response to a rise in the ambient temperature to a predetermined temperature, the element has to in each case be reversed with respect to its position illustrated in the drawing. In any event, the thermostatic element of this invention is capable in a selected environment of providing the desired snap or quick make and break action in a switch without in any way complicating the structure of the switch relative to that previously utilized in connection with conventional thermostatic elements which are non-magnetic. Furthermore, in the element of this invention, this is accomplished conveniently and economically since the element 10 is readily manufactured in what has heretofore been considered conventional thin strip form.

It will be understood that the laminated thermostatic switch elements described herein are presented for purposes of explanation and illustration only and are not intended to indicate limits of the invention, the scope of which is defined by the following claims.

What is claimed is:

1. In a switch having a pair of contacts, a thin laminated bi-metallic element secured to one of said contacts, said element consisting of a pair of laminations arranged in surface-to-surface contact and secured over substantially the entire area of their contiguous surfaces so that said laminated element acts as an integral whole, said laminations having different coefficients of thermal expansion and one of said laminations being a permanent magnet so that it can perform both magnetic and thermal functions.

2. In a switch according to claim 1 in which said permanent magnet lamina is an alloy of cobalt, iron and vanadium in substantially the following proportions:

|  | Percent |
|---|---|
| Cobalt | 47.5–48.5 |
| Iron | 47.5–48.5 |
| Vanadium | 3–5 |

3. In a switch according to claim 1 in which said contacts are thin gold layers.

4. A switch comprising a pair of members, facing contacts on said members arranged in a closely spaced relation for engagement on movement of said members toward each other, one of said members comprising a thin laminated element having at least two laminations formed of materials having different coefficients of thermal expansion which are arranged in surface-to-surface contact and secured over substantially the entire area of their contiguous surfaces so that said laminated element acts as an integral whole, one of said two laminations being a permanently magnetized material so that it can perform both magnetic and thermal functions.

5. A switch constructed according to claim 4 wherein said magnetized lamination has a lower coefficient of thermal expansion than the other one of said two laminations.

6. A switch constructed according to claim 4 wherein said magnetized lamination has a higher coefficient of thermal expansion than the other one of said two laminations.

7. A switch constructed according to claim 5 in which said permanent magnet lamina is an alloy of cobalt, iron and vanadium in substantially the following proportions:

|  | Percent |
|---|---|
| Cobalt | 47.5–48.5 |
| Iron | 47.5–48.5 |
| Vanadium | 3–5 | and said other lamina is an alloy having a coefficient of thermal expansion greater than $15 \times 10^{-6}$ per °C. at 100° C.

8. A switch constructed according to claim 4 in which said one member has the contact thereon affixed to one of said laminations other than said permanently magnetized lamination.

9. A switch constructed according to claim 4 in which said members are arranged relative to each other so that the contact on said one member is moved away from the other contact in response to increased ambient temperature and the contact on said one member is secured to said permanently magnetized lamination.

10. A switch comprising a pair of facing contacts, a bi-metal strip fixed at one end and secured at the opposite end to one of said contacts, said strip consisting of two different metal alloy laminations one of which has a higher coefficient of thermal expansion than the other, said lamina being arranged relative to said contacts so that when the ambient temperature is increased said one contact is moved away from the other contact, said opposite end of said strip being reversely bent upon itself and having the lamination with the lower coefficient of thermal expansion formed of a permanently magnetized material and affixed to said one contact so that said lamination will perform both magnetic and thermal functions in said switch.

References Cited by the Examiner

UNITED STATES PATENTS

| | | | |
|---|---|---|---|
| 2,300,418 | 10/1942 | Hall | 200—122 X |
| 2,321,338 | 6/1943 | Ulanet | 200—138 |
| 2,898,422 | 8/1959 | Peek | 200—87 |
| 2,922,857 | 1/1960 | Peek | 200—87 |
| 3,217,122 | 11/1965 | Bernstein | 200—87 |

OTHER REFERENCES

Bozarth: Ferromagnetism, D. Van Nostrand Company, Inc., New York, 1951, pp. 200 to 205.

BERNARD A. GILHEANY, *Primary Examiner.*

T. MACBLAIN, H. A. LEWITTER, *Assistant Examiners.*